Oct. 26, 1937.     Z. V. WEISEL     2,097,007
VARIABLE SPEED TRANSMISSION
Filed Nov. 8, 1933     2 Sheets-Sheet 1

INVENTOR:
ZENAS V. WEISEL
BY O. O. Martin
ATTORNEY.

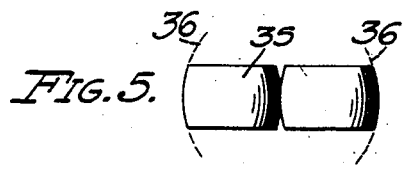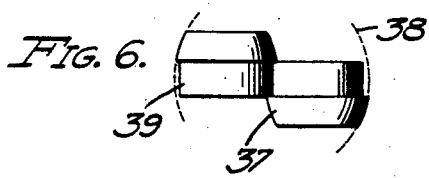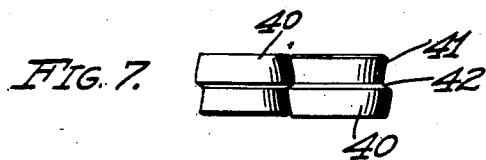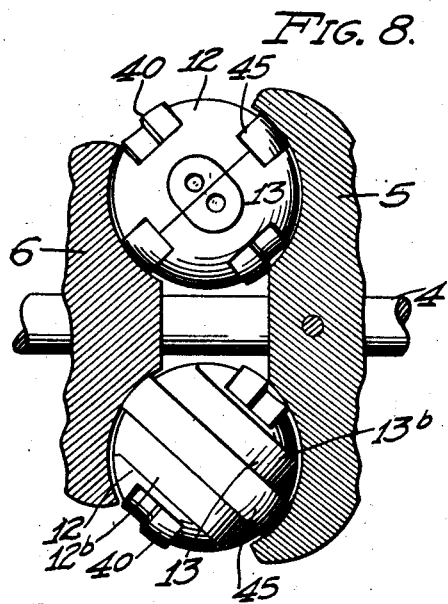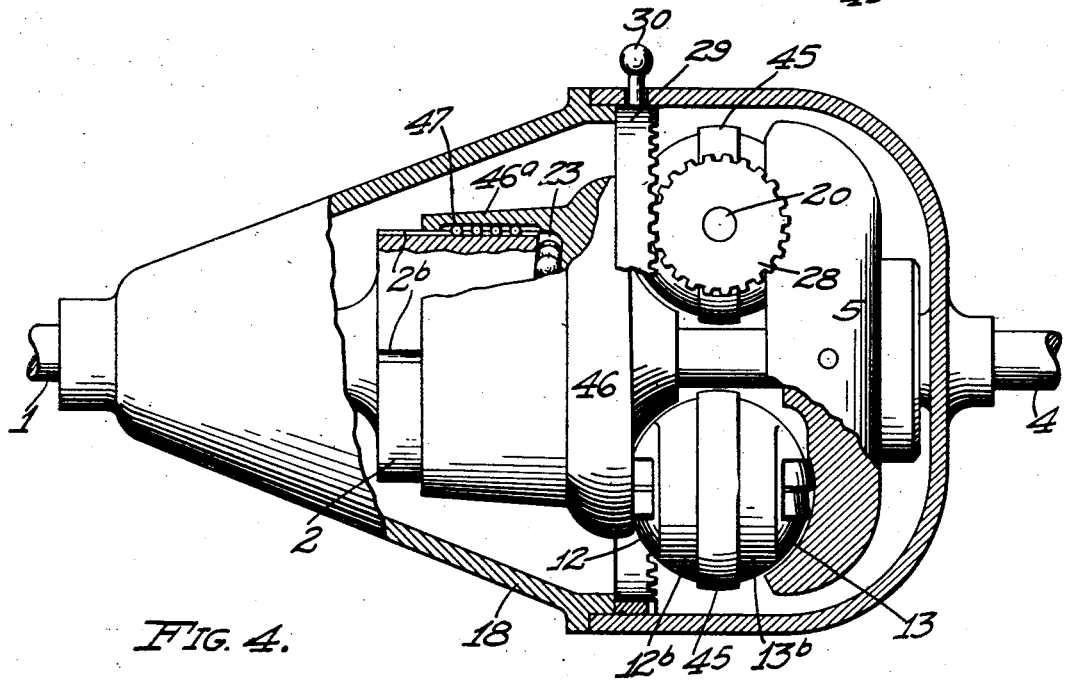

Patented Oct. 26, 1937

2,097,007

UNITED STATES PATENT OFFICE 2,097,007

VARIABLE SPEED TRANSMISSION

Zenas V. Weisel, Los Angeles, Calif., assignor of two-thirds to John R. Stebbins, Los Angeles, Calif.

Application November 8, 1933, Serial No. 697,156

22 Claims. (Cl. 74—200)

This invention relates to a variable speed power transmission of the friction type, in which a member is connected to rotate a second member through the medium of rollers interposed between the members.

One object of the invention is to provide a device of this type, in which speed variations may be effected without interrupting or otherwise disturbing the continuous operation of the device. Another object is the provision of a device so perfectly balanced that such speed variations may be effected smoothly, without scraping and without any particular expenditure of power. A further object is to provide a device of this character capable of transmitting rotations both in forward and reverse direction and at variable speeds in both directions. Another object is the provision of means for turning such interposed rollers on their axes, thereby to alter their direction of movement for the purpose of changing the speed ratio and for reversing the direction of rotation transmitted. Another object is to provide means whereby the pressure necessary to prevent slippage of the rolling contacts is automatically applied in direct proportion to the input torque.

Figure 1:
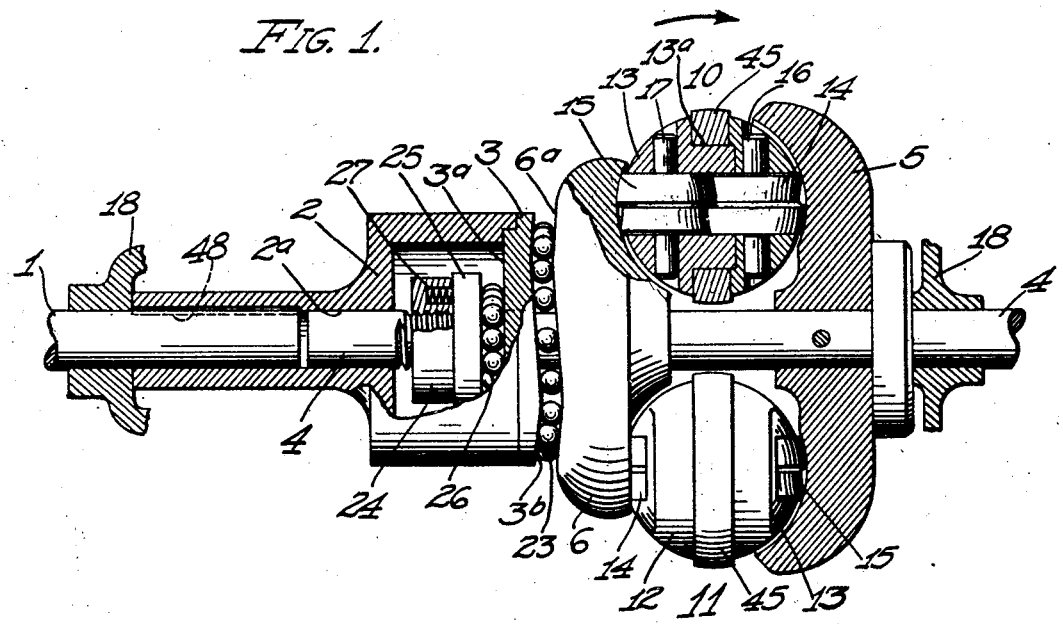
Figure 2:
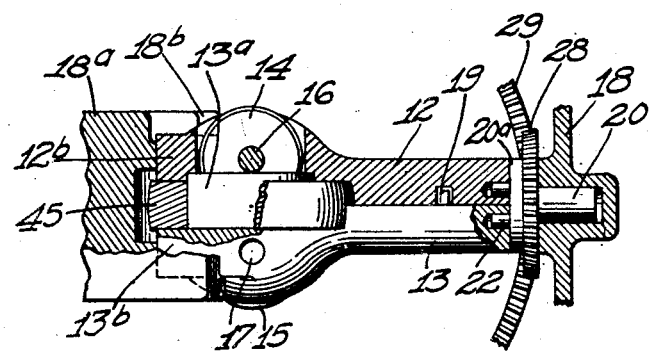
Figure 3:
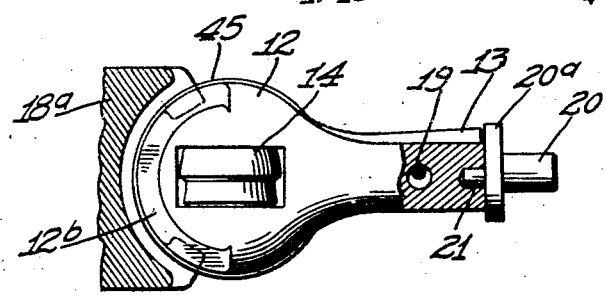

These and the further important objects and advantageous features of my invention are hereinafter fully described and illustrated in the appended drawings, of which:

Fig. 1 illustrates the main features of the invention as they appear when removed from the casing, and they are shown partly in section in order to disclose interior parts, Fig. 2 is a side elevation of one of the roller units of Fig. 1, and it is shown with parts broken away for the sake of clearness, Fig. 3 is a substantially corresponding plan view of this roller unit, and it is also shown partly in section, Fig. 4 shows the device of my invention assembled in its casing, and with portions of the casing and of other parts broken away in order to facilitate perusal of the drawings, Figs. 5, 6 and 7 illustrate various shapes of rollers adapted for use in my invention, and Fig. 8 is a fragmentary view showing the roller units of my invention as positioned in order to transmit rotation in reverse direction.

Referring in the first instance to Fig. 1, the numeral 1 designates a drive shaft terminating at the end in a cupshaped head 2, the mouth of which is closed by an annular thrust member 3. These parts are suitably, rigidly combined for common rotation. The head 2 is counterbored at 2ª to receive the end of a shaft 4, and the member 3 is centrally perforated to admit this shaft which, in this manner is rotatably supported by the head and the thrust member in continued alinement with the drive-shaft.

On the shaft 4 is rigidly mounted a disk 5, and a second disk 6 is hung to rotate on the shaft intermediate the former and the thrust member 3. For the sake of clearness of description, the disks 6 and 5 will be referred to as the driving and the driven disk, respectively. The opposed inner faces of the two disks are made with identically cupped annular tracks, the shape of which is generated by moving a circle about the axis of the driven shaft at a given radius, the generating circle always lying in a plane containing said axis.

In the annular, grooved space between the two disks are shown seated two power transmitting units 10 and 11, both of which may be identically alike and the corresponding parts of which are herein referred to by the same reference numerals. As shown in Figs. 1 and 2, each unit comprises a casing made in two parts 12, 13, transversely perforated to receive two alined rollers 14, 15, seated to rotate on stationary shafts 16, 17 of the casing members 12 and 13 respectively. These rollers always relatively contact and, when in contact with the annular grooves of the disks, serve to transmit rotation from one disk to the other. In Fig. 1, the plane of these rollers is shown parallel with the axis of the shaft 4, the result being that the two disks will rotate at the same speed and in the same direction.

In such variable speed transmissions, of the type herein considered, as have come to my notice, only single power transmitting rollers have been employed, the result being that the driving disk and the driven disk rotate in opposite directions. This has been found commercially impractical for several reasons, some of which will hereinafter be pointed out and discussed. Where single rollers are used, causing the driver and the driven to rotate in opposite directions, one disadvantage is that the relative rotation of the two disks is equal to the sum of the rotation of the disks. When considered that a relatively large thrust load is required to prevent slipping, particularly in the presence of oil, the disadvantage of the single roller is fully appreciated by those versed in the art.

It has been suggested, in order to overcome this difficulty, to provide two driving disks and an intermediate driven disk, with single rollers on both sides of the latter. In this manner, the driver and the driven are rotated in the same direction, but resulting in a very much more complicated and costly device, much more difficult to control, as will become clear from the following continued description of my device.

The casing members 12 and 13 are shown pivotally combined, and this may be effected by raising an annular flange 13ª from the inner face of the member 13, and by counterboring the contacting surface of the member 12 rotatably to fit this flange. The right ends of the two members are recessed to receive studs 21, 22, of a flange 20ª extending from a pivot 20. A slight rotation of this pivot and flange causes the members to turn slightly on the flange 13ª, thereby to turn the roller 14 at a slight angle to the path it has followed, and the roller 15 an equal distance in the opposite direction. This very slight angular change can be effected without any particular expenditure of force, and the result of this change is to cause the two rollers to travel in a controlled stable spiraling movement the direction set until the position of a desired new speed ratio is attained, during which movement the units 10 and 11 are caused to turn on the pivots 20 and on the spherical ends 12ᵇ, 13ᵇ whereupon the pressure on the flange 20ª is relieved, permitting the rollers again to straighten themselves and to resume a circular track. Such changes are effected without disturbing or disrupting the continuous operation of the device. But in my double roller drive, no such friction is encountered, the angle of inclination directs the path, and the two rollers are equally inclined from the true circular path so that one roller rolls out exactly the same distance along the arc of the toroidal surface as the other rolls in, causing the spiraling of the rollers to perfectly balance each other because the line of action, being perpendicular to the surface of the rollers, passes through the center of each unit. That is, the forces are exactly in line, of equal magnitude and opposite in direction. The shafts 16, 17 do not carry any of the compressive load, nor do the units take any thrust other than that incidental to guiding the pairs of rollers. In Fig. 3, this angular inclination is shown very much exaggerated, but in actual practice it is almost indiscernible. This movement is shown limited by a pin 19, of the member 13, seated in a slightly larger pocket of the member 12.

Returning now to Fig. 1, the thrust member 3 is shown made with a flat face 3ª, and its opposite face is made wedge-shaped by providing thereon a succession of slightly inclined surfaces 3ᵇ. The opposed face of the disk 6 is shown provided with corresponding inclinations 6ª, and between the two surfaces are placed a series of balls 23. Axially adjustable on the driven shaft 4 is a collar 24, adjacent which a flat disk 25 is hung to rotate. Between the latter and the thrust member 3 is placed a string of balls 26, and a plurality of springs 27, seated in the collar 24, exert pressure against this disk and, through the instrumentalities enumerated, yieldingly to maintain the rollers 14, 15 in contact with the driving and the driven disks 6 and 5. These springs may be said to preload the mechanism. The entire mechanism is shown mounted within a casing 18, as best shown in Fig. 4.

A rotation of the driving shaft and the rigidly affixed thrust member 3 is opposed by the driving disk 6, causing a relative circumferential displacement and compelling a number of balls 23 to be tightly wedged, in turn forcing a corresponding rotation of the driving disk, all as well known in the art.

Fig. 4 illustrates the completely assembled device, and the location of the parts described may be readily estimated by referring again to Figs. 1 to 3 if, for the sake of clearness, they are not visible in this view.

Attached to each pivot 20, see also Fig. 2, is a gear wheel 28, in mesh with a crown gear 29, and the latter is mounted within the casing to slide circumferentially by means of a finger piece 30 which projects through the wall of the casing. A very slight movement of this crown gear suffices to incline the rollers to change the speed ratio, and a slight continued pressure against the finger piece, while the rollers move to the position of the desired speed ratio, causes the crown gear to follow this circumferential movement. The moment the desired speed ratio is attained, the pressure against the finger piece is relieved, permitting the rollers instantly to return to the position of alinement with the new circular track they are to follow, and they will remain in this position until the crown gear again is moved circumferentially in the casing.

In Figs. 5, 6 and 7, rollers of various shapes are illustrated for the purpose of explaining certain important features of the invention. Following the common and well established ball and roller bearing practice, the peripheral curve of the rollers 35, see Fig. 5, has a slightly shorter radius than the disk curve 36, in order that, when under load, complete contact between the roller and disk may be obtained. A different condition is found, however, between the two rollers where, even under load, a very small contact surface is obtainable. The result is, that the pressure against this small contact surface is much greater than that between the roller and disk, and may become so great as to fatigue the roller.

For the purpose of equalizing these contact surfaces I may modify the shape of the roller, substantially as indicated in Fig. 6, by dividing the roller periphery into two parts, a convex portion 37, for contact with the disk 38, and a cylindrical portion for inter-roller contact. In such manner am I enabled to obtain substantially equal contact at all points.

The modification of Fig. 7 is a composite structure, embodying the features of the aforenamed two modifications. It is produced by cutting into the periphery of the rollers 40 a groove comprising a concave side 41, for engagement with the adjacent roller (which for this purpose has been reversed) and a conical side 42, for engagement with the conical side 42 of the other roller. By properly proportioning this groove relative to the width of the roller, the most equal contact relation of roller to disk and roller to roller may be obtained. With this in view, the roller shape may be varied greatly, and the shapes shown are merely illustrative of the feature.

The structure hereinbefore described is capable of continuously transmitting rotation, at various speeds, without interrupting or disturbing the power output, in one direction. It is however, in certain industries, such as the automotive, necessary to provide a mechanism operable to transmit rotation in both directions. This I may accomplish in the following manner.

In Figs. 1 and 2, I have shown an annular ring, or roller 45, seated to rotate on the flange 13ᵃ. This is the reverse rotation roller. To bring it into service, it is best to relieve the load on the mechanism, as by releasing the clutch of an automobile, whereupon the crown gear 29 is rotated far enough to turn the roller units, in the direction of arrow of Fig. 1, until this reverse roller comes into contact with the disks. This position is indicated in Fig. 8. When brought into this position, the clutch may be reengaged, and rotation in the opposite direction is obtained. While this part of my device is limited to a narrower field of speed changes, and while it is advisable to relieve the load as a preliminary to bringing it into service, it is entirely practical and convenient for use in industries where such limitations are found, as it is in motor vehicles.

The outer ends of the casing members 12 and 13 are supported in the main housing 18 by the pivots 20. The inner ends of these members may conveniently be supported on brackets 18ᵃ, of the main housing 18, in which are cut grooves shaped to form circular arcs of a size to receive the inner, circular ends 12ᵇ, 13ᵇ, of the members 12 and 13. As the center of these circular arcs coincides with the center line through the rollers 14, 15 and 45, it is seen that, in such manner, the two members may be supported and still have freedom of relative rotative movement.

It was above stated, that the drive shaft 1 and the cup-shaped head 2 are combined for common rotation. In the operation of the device, there will be found a slight relative axial movement of these parts and, while such movement may be negligible, it may be preferred to provide relative freedom of axial movement. This may be accomplished by mounting a feather key 48 in the head 2 for engagement with a keyway in the shaft, substantially as indicated in Fig. 1.

The driving disk 6 has, in Fig. 4, been modified. The disk 46 may remain substantially like the former, except that it is shown made with a flange 46ᵃ, encompassing the head 2, for the purpose of maintaining the disk in perfect alinement, under load. As a slight relative axial movement of the head and disk may occur, it is well to provide antifriction balls, or rollers, 47 between these parts, and these rollers or balls are free to run in an internal annular groove of the flange 46ᵃ. For the purpose of maintaining such antifriction members in position, I have shown a series of axially directed peripheral retaining grooves 2ᵇ. But much more mechanically suitable retaining means may, of course, be substituted.

From the foregoing description it should be possible for those versed in the art to construct a reversible, variable speed friction drive within the limits of the following claims.

I claim:

1. In a variable speed transmission, in combination with a pair of opposed co-axial disks, rotation transmitting units arranged to contact with said disks to rotate the disks in the same direction, and separate means mounted on said units for rotating the disks in opposite directions.

2. In a variable speed transmission, in combination with a pair of co-axial disks, a plurality of rotation transmitting rollers arranged in peripherally inter-contacting pairs to contact said disks to follow circular tracks on the disks, and means for axially turning the two rollers of each pair in opposite directions on the center line of the two rollers to cause the rollers to depart from said circular tracks for the purpose of changing the speed ratio of the disks.

3. A variable speed transmission comprising, a driving disk, a driven disk, a plurality of rotation transmitting units between said disks, each unit comprising a pair of peripherally inter-contacting rollers arranged to contact said disks, and a third roller encompassing each pair of rollers for contact with both disks when the said two rollers are brought out of contact with the disks for rotating the driven disk in the opposite direction.

4. A variable speed transmission comprising, a driving disk and a driven disk in axial alinement, said disks having opposed annular grooves shaped in cross section to form circular arcs having a common center, a plurality of rotation transmitting units in the circular space between said disks, each unit comprising a pair of peripherally inter-contacting rollers making circular tracks in the grooves of the disks, and means for relatively axially turning one roller of each unit relative to the other roller of the same unit to cause the rollers to depart from their circular tracks, thereby to change the speed ratio of the two disks.

5. In a variable speed transmission, a driving disk and a driven disk in co-axial alinement, said disks having opposed annular grooves shaped in cross section to form circular arcs having a common center, a plurality of rotation transmitting units in the circular space between said disks, each unit comprising two casing members pivotally combined, a roller hung to rotate in each member on an axis intersecting the casing axis, the two rollers being in peripheral contact with each other and also in contact with the annular grooves of the two disks, the rollers being normally aligned to follow circular tracks in the grooves, and means for turning the two casing members on their pivot thereby relatively to swing the two rollers out of line and to cause the rollers to depart from their circular tracks for the purpose of changing the speed ratio of the two disks.

6. In a variable speed transmission, a driving member, a co-axial driven member, said members having opposed annular grooves shaped in cross section to form circular arcs on a common center, pairs of rollers bridging the circular space between the members, each pair of rollers being in peripheral contact with each other and alined to follow circular tracks in said grooves, and means for swinging said rollers out of relative alignment thereby to cause the rollers to depart from such circular tracks for the purpose of changing the speed ratio of the members.

7. In a variable speed transmission, a driving disk and a driven disk, supports, a pair of peripherally inter-contacting rollers in each support in contact with said disks and arranged normally to follow circular tracks in said disks, means for relatively inclining said rollers angularly to cause the rollers to depart from the circular tracks to change the speed ratio of the disks or entirely to move out of contact with the disks, and a roller in each support and encompassing said two rollers for contacting the disks when the latter are brought out of contact for rotating the driven disk in the opposite direction.

8. In a variable speed transmission of the friction type, a pair of co-axial disks, a plurality of devices mounted between the disks for frictional contact therewith to transmit rotation from one disk to the other in the same direction, and means incorporated into each device and arranged to be brought into frictional contact with the disks when the said devices are brought out of contact therewith for transmitting rotation in the opposite direction.

9. In a variable speed transmission, a driving disk and a co-axial driven disk, said disks having opposed annular grooves shaped in cross section to form circular arcs on a common center, a pair of identical rollers bridging the circular space between the disks, the peripheral contour of each roller comprising two sections, one section of each roller being spherical for disk groove contact, the other being shaped to provide peripheral interengagement between the two rollers across the entire section to afford substantially the same contact surface between the rollers as between each roller and its disk.

10. In a variable speed transmission, a pair of co-axial disks, said disks having opposed annular grooves shaped in cross section to form circular arcs around a common center, a pair of rollers bridging the circular space between the disks, substantially one-half the peripheral face of each roller being convex for contact with the disk grooves, the remaining portion of the roller face being made correspondingly concave to permit the convex portion of one roller to fit into the concave portion of the other.

11. In a variable speed transmission, a shaft, a disk driven with the shaft, a driving disk rotatable on the shaft, said disks having opposed annular grooves shaped in cross section to form circular arcs having a common center, pairs of peripherally inter-contacting rollers in peripheral contact bridging the circular space between the disks, said rollers turning on axes which normally are parallel and coplanar, means for shifting the axes out of their common plane to change the speed ratio of the disks, and means rotatable on the shaft for applying pressure against said driving disk in proportion to the input torque to prevent slippage of the rollers and disks.

12. The combination with a driving disk and a driven disk having opposed toroidal grooves, of a plurality of roller units, each comprising a casing made in two half parts rotatable on a common axis, a roller mounted in each half part on a shaft perpendicular to the axis of rotation of the part, the two rollers being in peripheral contact with each other and with the disk grooves, means for turning the parts on their common axis angularly to incline one roller relative to the other on the centerline of the rollers thereby to cause the rollers to travel on the disks in a controlled spiral to change the speed ratio of the disks or to move out of contact with the disks, and an annular roller mounted in each unit to rotate on the common axis of the two parts for contacting the disk grooves when the two rollers have rolled out of contact therewith, thereby to reverse the direction of rotation of one disk relative to the other.

13. In a variable speed transmission, a casing, opposed disks coaxially mounted in said casing, roller units each comprising two equal half members combined to form a substantially spherical body from which extends a substantially cylindrical neck, there being in the casing seats engaging the spherical ends of the body, there being in the opposite end of each member a socket, a stud in the casing coaxially alined with the unit and having projections seated in said sockets, a roller centrally hung in the body part of each half member with its axis perpendicular to the longitudinal axis of the half member, the two rollers contacting each other peripherally and bridging the space between the disks, and means for axially rotating said stud to change the angular relation of the rollers equally in opposite directions to permit the rollers to take a controlled stable spiral path on the disks to change the speed ratio of the disks, the units being free to rotate axially to follow the path of the rollers.

14. In a variable speed transmission, a driving member, a driving disk, a driven disk, all three coaxially alined, units comprising peripherally inter-contacting rollers bridging the space between said disks, the opposed faces of said driving member and driving disk having a corresponding series of inclinations, rolling elements between said inclined faces, said driving disk being made with a flange encompassing said driving member, and axial ball bearings between said flange and the said member for eliminating friction during relative axial movement of these parts as the rolling elements climb the inclines to apply driving pressure to the mechanism.

15. In a variable speed transmission, a driving member, a driven shaft coaxial with and rotatable in said member, a driving disk rotatable on said shaft, a driven disk fixed on the shaft, rotation transmitting units between the two disks, said driving member terminating in a hollow cylindrical head adjacent said driving disk, the opposed faces of the two having corresponding inclinations, rolling elements between said faces, a fixed collar on the driven shaft within said head, a loose collar adjacent said fixed collar, balls between the loose collar and the inner face of the head, and means between the collars for yieldingly forcing the loose collar against said balls for preloading the device.

16. In a variable speed transmission, a roller unit shaped to represent a substantially spherical body from which extends a substantially cylindrical neck, said unit being divided axially into two half members pivotally combined on the centerline of the body, a roller in each half member the axis of which intersects the pivotal axis of the member, the two rollers being in peripheral contact with each other, and an annular roller centrally seated in the two members concentric with their pivotal axis, between the axes of and encompassing the two rollers.

17. In a variable speed transmission, an axially rotatable roller unit comprising, a substantially pear shaped body divided axially into two half members pivotally combined on the centerline of the body, and a roller in each half member the axis of which intersects the pivotal axis of the member, the two rollers being in peripheral contact with each other.

18. In a variable speed transmission, a pair of co-axial disks having opposed toroidal grooves, rotation transmitting units between said disks, each unit comprising a pair of peripherally inter-contacting rollers contacting said grooves, said rollers turning on normally coplanar axes, and means for turning the two rollers of each pair so that the axes of the rollers are turned in opposite directions out of their common plane to cause one roller to roll toward the center of one disk and the other roller of the same pair to roll away from the center of the other disk to change the speed ratio of the two disks.

19. In a variable speed transmission, the combination with a pair of co-axial disks, of pairs of rotation transmitting peripherally inter-contacting rollers bridging the space between said disks, said rollers turning on axes which normally are coplanar and parallel, means for shifting the axes out of their common plane to cause one roller to roll outwardly on one disk and the other roller of the same pair to roll inwardly on the other disk, and means for regulating the load required to prevent slippage relative to the torque applied.

20. In a variable speed transmission, a casing, a driving disk, a co-axial driven disk, rotation transmitting units journaled in the casing for axial rotation, each unit comprising two peripherally inter-contacting rollers bridging the space between the disks on normally coplanar axes perpendicular to the unit axis, means for rotating said units axially for turning the two rollers of each pair so that the axes of the rollers are turned in opposite directions out of their common plane to cause the rollers to take a controlled stable spiral path on the disks to change the speed ratio of the latter, the movement of the rollers along said spiral path compelling the units to continue rotating axially in the same direction.

21. In a variable speed transmission, a casing, a driving disk, an opposed co-axial driven disk, both mounted in the casing, rotation transmitting units journaled in the casing for axial rotation, each unit comprising two peripherally inter-contacting rollers bridging the space between the two disks on normally coplanar axes perpendicular to the unit axis, means for rotating said units for turning the two rollers of each pair so that the axes of the rollers are turned in opposite directions out of their common plane to cause the rollers to assume a controlled stable spiral path on the disks and thereby to cause the units to continue rotating to follow the path of the rollers.

22. In a variable speed transmission, a casing, a driving disk and a co-axial driven disk, both mounted in the casing, rotation transmitting units journaled in the casing for axial rotation, each unit shaped to resemble a substantially spherical body from which extends a substantially cylindrical neck and being separated on the longitudinal axis through the body and neck into two members pivotally joined on the centerline of the body perpendicular to the plane of division, a roller centrally hung in the body portion of each member with its axis perpendicular to the longitudinal axis of the member, the two rollers contacting each other peripherally and bridging the space between the disks, and means for rotating the units axially to swing the members on their pivot an equal distance in opposite directions and thereby to turn the rollers equally in opposite directions to cause the rollers to take a controlled stable spiral path on the disks and the units to continue axial rotation to follow the path of the rollers.

ZENAS V. WEISEL.